United States Patent Office

2,814,604
Patented Nov. 26, 1957

2,814,604

COMPOSITIONS COMPRISING DIISOCYANATE-LINKED ELASTOMERS AND SILICON DIOXIDE

Robinson F. Nichols, Cuyahoga Falls, Ohio, and Robert O. Weisz, Fort Wayne, Ind., assignors to The B. F. Goodrich Company, New York, N. Y., a corporation of New York No Drawing. Application February 7, 1955,
Serial No. 486,699

3 Claims. (Cl. 260—40)

This invention relates to novel compositions of matter comprising polyurethane elastomers and silicon dioxide and relates more particularly to mixtures of glycol-based polyurethane condensation elastomers and finely divided silicon dioxide in which the hot stress-strain properties of the elastomer composition are improved.

Polyurethane elastomers obtained by reaction of polyesters, polyesteramides, polyalkylene ether glycols and the like with organic diisocyanates are known. It is also known that the fillers ordinarily used in compounding the more conventional elastomers do not improve the physical properties of polyurethane elastomer vulcanizates and in most cases result in compositions having very poor physical properties. One of the main drawbacks to the use of fillers in polyurethane elastomers has been the poor hot tensile strength of the vulcanizates. Further, many of the polyurethane elastomer vulcanizates containing the ordinary fillers are crumbly and cheesy and easily torn apart. It is necessary, of course, for many elastomer applications, that vulcanized stocks retain some strength at high temperatures which is not the case of most mixtures of fillers and polyurethane elastomers.

It has now been discovered that a particular silica compound, finely divided pigment grade white silicon dioxide, may be employed with polyurethane elastomers to form compositions which when vulcanized have physical properties approximating those of the unfilled elastomer and which in addition have extremely good hot stress-strain properties and tear resistance.

The finely divided white silicon dioxide employed in the practice of this invention is a fiber-containing particulate having an average particle size of from about 5 to 600 millimicrons, preferably from about 50 to 600, a surface area of from about 60 to 300 square meters per gram, preferably from about 60 to 200 and is in fibrous form wherein the fibers have a ratio of width to length of from about 1:10 to 1:50. The preparation of a preferred silicon dioxide which is essentially an oxidized silicon monoxide is described in the copending application of Edwin D. Newton and Daniel S. Sears, Serial No. 433,289, which was filed May 28, 1954.

The amount of silicon dioxide employed may be varied from about 1 to 100 weight parts per 100 weight parts of polyurethane elastomer depending, of course, upon the degree of extension and end-product physical properties desired. Preferably an amount of silicon dioxide of from about 5 to 50 weight parts are ordinarily employed in order to obtain compounds and vulcanizates of optimum physical properties.

It is quite surprising that the silicon dioxide may be successfully employed to form useful compositions with polyurethane elastomers. Polyurethane elastomers containing the so called "arc" silica such as that described in U. S. Patent 2,573,057 yield vulcanizates having very poor hot tensile strength. Further, silicon monoxide, the so called "monox" as described in U. S. Patent 993,913 likewise, while more useful than "arc" silica in polyurethane elastomers, still does not result in compositions which have good hot tensile strength. Further, both "arc" silica and "monox" result in compositions which have poorer initial tensile properties than is the case when silicon dioxide is employed.

The finely-divided silicon dioxide is added to the polyurethane elastomer on a mill, in a mixer or by means of any of the usual methods employed in compounding such elastomers. The resulting mixtures may be vulcanized by heating the compound containing additional diisocyanate or other vulcanizing agents for polyurethane elastomers. The additional diisocyanate may be any aliphatic, alicyclic or aromatic diisocyanate known to those skilled in the art.

The polyurethane elastomers and methods for their preparation are well known. U. S. Patents 2,432,148, 2,621,166, 2,625,531, 2,625,532 and 2,692,874 describe various methods of preparation. Ordinarily a polyester, polyesteramide or polyalkylene ether glycol of a molecular weight from about 1000 to 2500 or higher is reacted with an aromatic diisocyanate having isocyanate groups as the sole reactive groups, in about an equivalent of a molar ratio although there is often a slight excess of diisocyanate added. The resulting polyurethane elastomer is essentially a linear polyurethane which is cured or vulcanized by mixing with additional organic diisocyanate and heating; unless there is sufficient excess of diisocyanate initially mixed with the polyester or polyesteramide, in which case further heating and/or exposure to bifunctional additives such as water, diamines, glycols and the like causes curing or vulcanization. The excess diisocyanate may be present or added in amounts from about 1 to 25, preferably 3 to 15, weight parts per 100 weight parts of polyurethane elastomer.

The polyesters are ordinarily formed by the condensation reaction of a dibasic aliphatic acid with a glycol, ordinarily a $C_2$ to $C_{10}$ glycol and a $C_4$ to $C_{10}$ dibasic acid. The polyesteramides are formed by the condensation of a dibasic aliphatic acid with a mixture of a glycol, an amino alcohol and/or an aliphatic diamine. In the case of the amino alcohol or diamine the latter two ingredients ordinarily are present in the reaction mixture in an amount less than one-half the amount of glycol employed so that the major portion of the linkages in the polymer chain are ester linkages with a minor proportion of amide linkages being present.

The reaction product of the polyester, polyesteramide or polyalkylene ether glycol and an organic diisocyanate is ordinarily a rubbery material. There are many modifications of the chain-extending reaction of the basic polyester, polyesteramide or polyalkylene ether glycol with the organic diisocyanate such as the reaction being conducted in the presence of small amounts of glycols, diamines, water and the like but basically, most of the polyurethane elastomers are glycol-based condensation polymers.

In mixing the silicon dioxide with the polyurethane elastomer the silicon dioxide may be added prior to or after addition of the further amounts of organic diisocyanate required to vulcanize these compositions.

Regardless of how the polyurethane elastomer is prepared the addition of the defined silicon dioxide thereto results in novel compositions and vulcanizates which, among other valuable properties including lack of color, have extremely good hot stress-strain properties when compared to the hot stress-strain properties of similar compositions containing other silicon compounds.

In a typical embodiment of the invention a polyurethane elastomer is prepared by first reacting an excess of ethylene glycol with adipic acid. One mol of this hydroxyl poly(ethylene adipate) polyester which has a molecular weight of about 1400 is mixed with 0.3 mol of water and this mixture then reacted with 1.2 mols of para-phenylene diisocyanate at about 110° C. for about 30 minutes. The viscous reaction product is then poured into a suitable container and heated further for about 2 hours. The resulting polyurethane is a snappy, transparent elastomer gum which will process on a two roll mill at about 160° F. This elastomer is compounded in the following recipe and the compounded stock is vulcanized in a press by heating for 30 minutes at 298° F. and the stress-strain properties determined at room temperature and at 212° F. The silicon dioxide is prepared as described in the before-mentioned Newton and Sears copending application.

| Material: | Parts |
|---|---|
| Polyurethane gum | 100 |
| Beeswax | 0.2 |
| 1,5-naphthylene diisocyanate | 7.6 |
| Silicon dioxide | 20.2 |

The vulcanizates have a room temperature tensile strength of 7000 pounds per square inch, a 300% modulus of 1900 pounds per square inch and an elongation of 700%; and a tensile strength at 212° F. of 3400 pounds per square inch and an elongation of 975%.

For comparison purposes, when a similar compound is made with equivalent amounts of "arc" silica the tensile strength at 212° F. is only about 200 pounds per square inch, vulcanizates from compositions with "monox" have tensile strengths at 212° F. of about 600 to 1000 pounds per square inch, and vulcanizates from compositions containing 33 parts of calcium silicate have tensile strengths at 212° F. of 0.

When similar compounds are prepared with 40 parts of silicon dioxide, vulcanizates having tensile strength at 212° F. of about 2100 to 2700 pounds per square inch are obtained. The silicon dioxide-containing compositions are readily processed and formed and result in snappy vulcanizates of light color having an attractive surface appearance. Of course, that may be readily colored through the use of coloring pigments and dyes and the like. Tear resistance as compared to unloaded polyurethane elastomers is particularly improved with the silicon dioxide filler. The vulcanizates are tough and tear resistant having Shore A Durometer values of about 75 to 85.

Similar results are obtained when other polyurethane elastomers including those derived from polyesteramides, other polyesters, polyalkylene ether glycols, and other aromatic diisocyanates are employed. Good stress-strain properties are obtained in each case, and improved tear resistance is obtained in contrast to other silica fillers which deteriorate some of the desirable properties of polyurethane elastomers and which have exceedingly poor hot stress-strain properties. It is understood of course, that the silicon dioxide filled polyurethane elastomers which are not vulcanized are also useful in many applications where an unvulcanized material is desired.

We claim:
1. A composition of matter comprising (A) 100 weight parts of a polyurethane elastomer prepared by reacting (1) a material selected from the class consisting of: (a) polyesters prepared by the condensation reaction between a dibasic aliphatic acid and a molar excess of a glycol, (b) polyesteramides prepared by the condensation reaction between a dibasic aliphatic acid and a molar excess of a mixture made up of (i) at least 50% by weight of a glycol and (ii) the remainder of a material selected from the class consisting of amino alcohols and aliphatic diamines, and (c) polyalkylene ether glycols with (2) an aromatic diisocyanate having isocyanate groups as the sole reactive groups, the molar proportion of (2) being at least equivalent to that of (1) and (B) from about 5 to 50 weight parts of fibrous particles of silicon dioxide, said particles having an average particle size of from about 50 to 600 millimicrons, a surface area of about 60 to 200 square meters per gram, and a ratio of width to length of from about 1:10 to 1:50.

2. A composition of matter comprising (A) 100 weight parts of a polyurethane elastomer prepared by reacting (1) a polyester prepared by the condensation reaction between a dibasic aliphatic acid containing from 4 to 10 carbon atoms and a molar excess of a glycol containing from 2 to 10 carbon atoms with (2) an aromatic diisocyanate having isocyanate groups as the sole reactive groups, the molar proportion of (2) being at least equivalent to that of (1) and (B) from about 5 to 50 weight parts of fibrous particles of silicon dioxide, said particles having an average particle size of from about 50 to 600 millimicrons, a surface area of about 60 to 200 square meters per gram, and a ratio of width to length of from about 1:10 to 1:50.

3. A composition of matter comprising (A) 100 weight parts of a polyurethane elastomer prepared by reacting (1) one mol of hydroxyl poly(ethylene adipate) polyester of molecular weight of about 1400 prepared by reacting adipic acid with a molar excess of ethylene glycol with (2) about 1.2 mols of para-phenylene diisocyanate and (B) from about 5 to 50 weight parts of fibrous particles of silicon dioxide, said particles having an average particle size of from about 50 to 600 millimicrons, a surface area of about 60 to 200 square meters per gram, and a ratio of width to length of from about 1:10 to 1:50.

References Cited in the file of this patent

UNITED STATES PATENTS

| 2,428,252 | Von Stroh | Sept. 30, 1947 |
| 2,439,514 | Herndon | Apr. 13, 1948 |
| 2,602,783 | Simon et al. | July 8, 1952 |
| 2,606,162 | Coffey et al. | Aug. 5, 1952 |

OTHER REFERENCES

Seeger et al.: Ind. Eng. Chem. 45, 2538–2542, November 1953.